(12) United States Patent
Baier et al.

(10) Patent No.: US 9,062,698 B2
(45) Date of Patent: Jun. 23, 2015

(54) APPARATUS FOR HANDLING AND HOLDING A PIPE

(75) Inventors: Jens Baier, Hamburg (DE); André Vierke, Hamburg (DE)

(73) Assignee: Blohm + Voss Oil Tools GmbH, Hamburg (DE)

( * ) Notice: Subject to any disclaimer, the term of this patent is extended or adjusted under 35 U.S.C. 154(b) by 286 days.

(21) Appl. No.: 13/557,262

(22) Filed: Jul. 25, 2012

(65) Prior Publication Data
US 2013/0025847 A1    Jan. 31, 2013

(30) Foreign Application Priority Data

Jul. 25, 2011 (DE) .......................... 10 2011 108 654
Mar. 16, 2012 (DE) .......................... 10 2012 005 794

(51) Int. Cl.
*E21B 19/10* (2006.01)
*F16B 2/14* (2006.01)

(52) U.S. Cl.
CPC .. *F16B 2/14* (2013.01); *E21B 19/10* (2013.01)

(58) Field of Classification Search
USPC ...................... 166/77.51, 85.1, 85.5
See application file for complete search history.

(56) References Cited

U.S. PATENT DOCUMENTS

| 2,507,127 | A * | 5/1950 | True .............................. 294/199 |
| 8,720,542 | B2 * | 5/2014 | Hughes et al. ............. 166/77.51 |
| 2011/0132594 | A1 * | 6/2011 | Slack .......................... 166/77.51 |
| 2013/0269926 | A1 * | 10/2013 | Liess et al. ................. 166/77.51 |

* cited by examiner

*Primary Examiner* — William P Neuder
(74) *Attorney, Agent, or Firm* — W. F. Fasse (57) ABSTRACT

For handling and clamping a pipe, an apparatus includes plural clamping elements movably arranged in a device body configured as an annular shell. A positioning element is vertically movably arranged in the device body, and includes an obliquely sloping actuating surface that cooperates with a sliding surface of the clamping elements, so that a vertical or axial motion of the positioning element at least partially causes a horizontal or radial motion of the clamping elements. Also, a vertical or axial motion of the clamping elements is at least partially converted into a horizontal or radial motion thereof.

20 Claims, 6 Drawing Sheets

APPARATUS FOR HANDLING AND HOLDING A PIPE

PRIORITY CLAIM

This application is based on and claims the priority under 35 USC 119 of German Patent Applications DE 10 2011 108 654.8 filed on Jul. 25, 2011 and DE 10 2012 005 794.6 filed on Mar. 16, 2012, the entire disclosures of which are incorporated herein by reference.

FIELD OF THE INVENTION

The invention relates to an apparatus or device for handling and holding a pipe, wherein the apparatus includes a device body and at least two clamping elements that are movably arranged in the device body so as to exert a radial inward clamping motion and force component onto a pipe that extends through the apparatus.

BACKGROUND INFORMATION

An apparatus for handling and holding a pipe of the above mentioned general type is known, in which each clamping element has at least one sliding surface that cooperates with a corresponding surface of the apparatus in such a manner that a vertical motion of the clamping element is transformed into a horizontal motion component of the clamping element, which in turn exerts a clamping motion and clamping force onto a pipe that extends through the apparatus. Such apparatuses or devices are used, for example, in the field of offshore oil drilling technology, in order to hold and support pipes such as drill pipes from an oil drilling platform. In this regard, a pipe string is assembled from many individual pipe segments that are coupled with one another at their ends by respective mating threaded couplings. Namely, a drilling string or pipe string is assembled by successively lowering a pipe segment, then holding that preceding pipe segment while screwing the next successive pipe segment onto the preceding pipe segment, and then again lowering the growing pipe string in order to thereafter screw on the next pipe segment. This procedure requires an apparatus for handling and holding each pipe segment while the next pipe segment is screwed on, and then releasing the pipe segment in order to allow the pipe string to be lowered.

It is especially important for such pipe holding apparatuses to achieve a secure and reliable clamped support and holding of the respective pipe segment. In that regard it must be ensured that the clamping elements are oriented (as much as possible) axis-parallel to the pipe segment being clamped, and thereby achieve a parallel clamping contact on the pipe surface. Accordingly, it must also be ensured that a tipping or tilting of the clamping elements is avoided during the positioning of the clamping elements.

SUMMARY OF THE INVENTION

In view of the above, it is an object of the present invention to improve the design and construction of an apparatus of the above described general type, in such a manner so that it ensures a reliable and secure positioning of the clamping elements, as well as a secure and reliable handling and holding of a pipe that extends through the apparatus. This object is to be achieved through simple, robust and durable mechanical means. The invention further aims to avoid or overcome the disadvantages of the prior art, and to achieve additional advantages, as apparent from the present specification. The attainment of these objects is, however, not a required limitation of the claimed invention.

The above objects have been achieved according to the invention in an apparatus for holding a pipe, wherein the apparatus comprises a device body and at least two clamping elements that are movably arranged relative to the device body. According to the invention, each clamping element includes at least one sliding surface on a side of the clamping element facing toward the device body, and this sliding surface is arranged neighboring or adjacent to at least one actuating surface with which the sliding surface cooperates, so that a vertical or axial movement of the clamping element is at least partially transformed into a horizontal or radial movement component of the clamping element, whereby the clamping element moves radially inwardly into clamping contact against the pipe that extends through the apparatus. Also according to the invention, the apparatus further includes at least one positioning element that is vertically movably guided by the device body, such that a vertical or axial movement of the positioning element at least partially or section-wise prescribes a horizontal or radial positioning of the clamping element. Preferably, the actuating surface is provided on a radially inwardly facing surface of the positioning element, to cooperate with the radially outwardly facing sliding surface of the clamping element.

Through the combination of the clamping elements with a positioning element, it is possible to achieve sufficiently large actuating, positioning and holding forces applied by actuators such as pressure medium cylinders arranged to extend in the longitudinal axial direction of the device body. Additionally it is thereby possible to ensure a large surface contact of the clamping elements on the pipe as well as a reliable positioning of the clamping elements relative to the device body and the pipe. Especially, a tipping or tilting of the clamping elements relative to the axial direction is prevented by the use of the positioning element.

Furthermore, the inventive apparatus permits or achieves an adaptation to different sizes of pipe diameters, and also provides an extremely compact construction. Particularly, adapting the apparatus to different pipe diameters merely requires an exchange of the clamping elements in the device body to a different set of clamping elements, if the respective pipe diameter is outside of the diameter range or the specific diameter for which the installed clamping elements were designed.

A mechanically strong and highly loadable construction is achieved especially because the positioning element is preferably embodied with an annular ring shape.

It is further possible to disassemble and remove the apparatus laterally or radially from a pipe string extending through the apparatus, because the positioning element is preferably assembled from at least two segments, e.g. two ring segments. Similarly, the device body is preferably assembled from plural annular segments. This allows the device to be placed upon and removed from a pipe string that extends continuously axially is through the apparatus.

A wedging action and a redirection or deflection of a vertical or axial movement into a horizontal or radial direction while carrying out the positioning actuation movements is achieved because the actuating surface of the positioning element extends obliquely at a slope relative to the vertical or axial direction.

High positioning forces can be generated in that the apparatus further includes actuators such as hydraulically operated cylinders, whereby the positioning element is hydraulically actuated and driven relative to the device body. As an alternative to the hydraulic cylinders, other pressure medium cylinders such as pneumatic cylinders can be used to achieve a pneumatic actuation and positioning, for example. As further alternatives, any known type of actuator that applies a linear actuation can be used, such as an acme screw, a bell crank or a rod linkage.

Furthermore, the apparatus preferably additionally comprises a mounting support or holder for the clamping elements, whereby this mounting support is also positionable relative to the device body, so as to positively position the clamping elements in an axial direction relative to the device body. This can be achieved by additional actuators such as pressure medium cylinders, i.e. hydraulic or pneumatic cylinders, connected to the mounting support so as to achieve a hydraulic or pneumatic positioning of the holding support and therewith the clamping elements relative to the device body.

A reliable lifting and lowering of the movable components is achieved in that the hydraulic cylinders used for the hydraulic positioning or the pneumatic cylinders used for the pneumatic positioning are respectively embodied as double-acting cylinders. Furthermore, retracting the clamping element into an initial position is supported in that the clamping element is preferably pre-stressed relative to the mounting support by at least one return spring.

The preferred actuation is achieved when the mounting support for the clamping elements moves axially one-half the amount or distance of the axial movement of the positioning element. To ensure this coordinated motion actuation, the respective actuators are suitably coupled, for example control-coupled through a suitable controller that controls the hydraulic or pneumatic actuation of all of the cylinders, or mechanically coupled through a mechanical drive transmission or linkage, or through appropriate relative dimensioning of the respective cylinders. With such coordinated motion, and coordinated cooperation of sloping surfaces (as to be discussed next), thereby an axis-parallel orientation of the clamping elements is ensured, and a tipping or tilting thereof is avoided.

Preferably, a tilt-free movement and horizontal clamping adjustment of the clamping elements is achieved or supported in that the clamping elements have both an upper sliding surface as well as a lower sliding surface. Thereby it is suitably preferred that the upper sliding surface is arranged for cooperative contact with the actuating surface of the positioning element, while the lower sliding surface preferably cooperates with a guide surface of a guide element. A mechanically simple construction that also facilitates maintenance service and exchange of components is achieved in that the guide element is preferably stationarily yet removably connected with the device body. Thus, as the positioning element with its actuating surface is moved axially along the upper sliding surface of the clamping elements, the upper end of the clamping elements is thereby moved radially inwardly. At the same time, the mounting support axially moves the clamping elements in the same direction as the axial motion of the positioning element but only one-half the distance thereof. Thereby the lower sliding surface of each clamping element slides along the guide surface of the guide element, which deflects the lower end of each clamping element radially inwardly. In this preferred embodiment, the guide surface has the same slope angle as the actuating surface. Thereby the coordinated movement ensures the axis-parallel orientation of the clamping elements as they are moved axially along and radially inwardly into clamping contact on the pipe that extends continuously radially through the apparatus.

Furthermore, to improve the handling security, it is suggested that the device body preferably comprises an anti-rotation stop, for example in the form of flat surfaces on an upper collar of the device body. Thereby the upper collar can be received in a recess of the drilling platform or turntable while the flat sides of the upper collar mate with flat receiving walls of the recess to prevent a rotation of the pipe holding apparatus.

BRIEF DESCRIPTION OF THE DRAWINGS

In order that the invention may be clearly understood, it will now be described by way of example, with reference to the accompanying drawings, wherein.

DETAILED DESCRIPTION OF A PREFERRED EXAMPLE EMBODIMENT AND THE BEST MODE OF THE INVENTION

Figure 1:
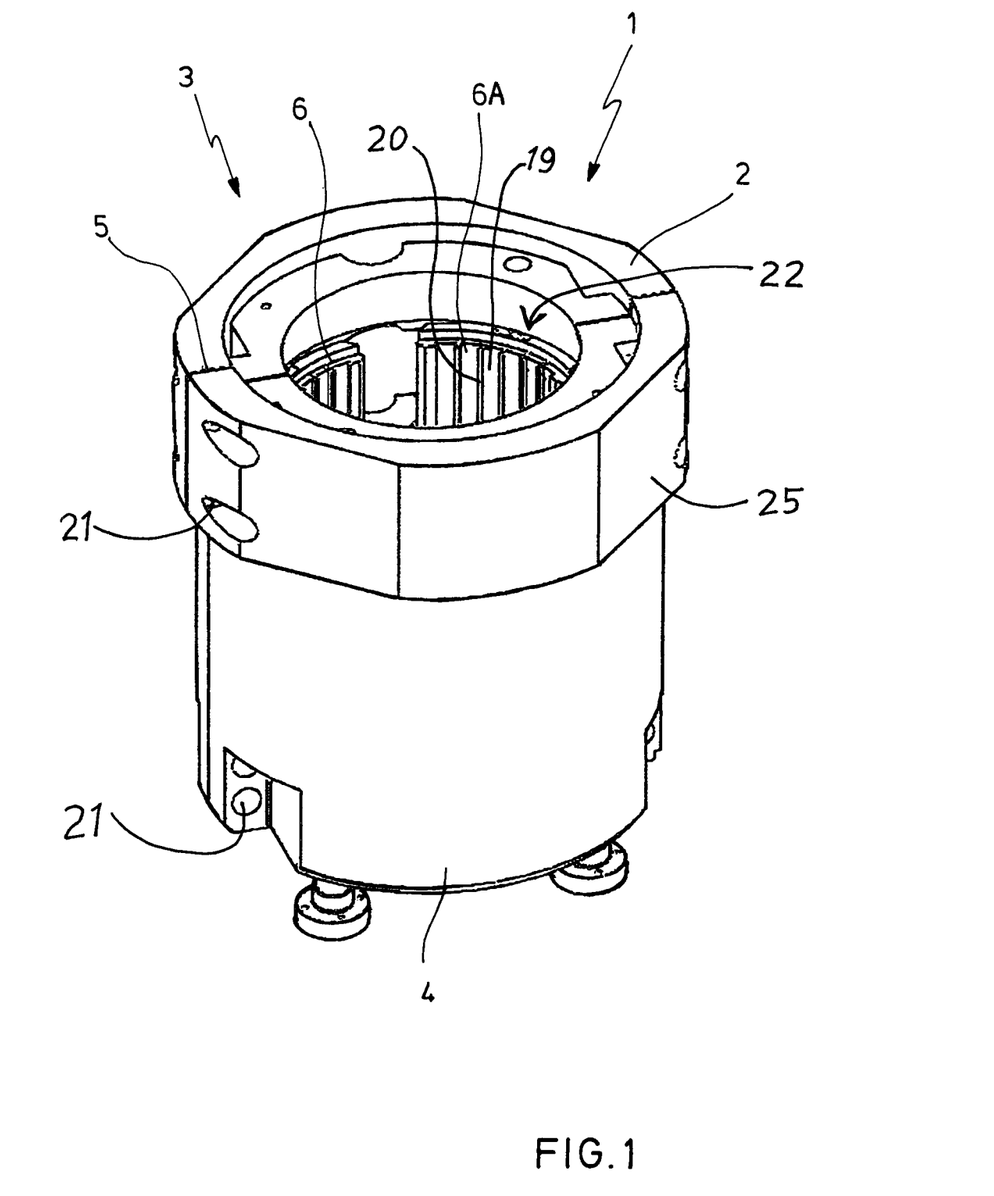
FIG. 1 is a perspective exterior view of a pipe clamping or holding apparatus according to the invention.

FIG. 1 shows a perspective external view of an apparatus for handling and holding a pipe according to the invention. The apparatus includes a device body 1 that generally has the configuration of a hollow annular cylindrical shell. In order to allow the apparatus to be easily mounted in a drilling platform or turntable for handling drill pipes, the device body 1 has an upper collar 2 at an upper end thereof. Thus, the device body 1 can be received in a hole in a drilling platform while the upper collar 2 is fittingly received in a recess around the hole in the drilling platform, or the collar 2 may rest on the upper surface of the platform. The collar 2 may further be provided with flat side surfaces 25 by which a rotation of the apparatus can be prevented, for example by engaging the flat side surfaces 25 with corresponding flat surfaces of a recess of the drilling platform, or flat surfaces of a suitable engaging tool. Alternatively, the apparatus can also be rotated as desired by engaging the flat side surfaces 25 with a suitable rotational driving tool or turntable.

In the illustrated example embodiment, the device body 1 includes two body segments 3 and 4 that border and are joined to one another along a vertical separating or parting plane 5. For example, the two segments 3 and 4 may be connected to one another by screws or bolts 21. This allows the apparatus to be easily removed from or arranged around a vertically axially extending pipe, such as a pipe segment of a drill pipe string that is being assembled or disassembled on the drilling platform. For simplicity and clarity of the drawings, the pipe segment itself is not illustrated, but it should be understood that the pipe extends vertically axially through the opening 22 of the apparatus.

Visible through this upper opening 22 of the hollow annular cylindrical device body 1, plural clamping elements 6 are provided for selectively clamping and releasing the pipe that extends vertically axially through the apparatus. In this regard, each clamping element 6 has a radially inwardly directed clamping surface 6A provided with a profiled surface contour including recessed grooves 19 and/or protruding ribs 20 that extend in an axis-parallel direction. This profiled surface contour ensures that the clamping surface 6A can make a good uniform surficial clamping contact and engagement with the outer surface of the pipe, with a good distribution of the clamping force as well as high local clamping forces, regardless of the pipe surface condition, e.g. whether the pipe has a smooth regular surface or a rough surface or an irregular surface.

In order to apply the radially inwardly directed clamping force onto the pipe, the clamping elements 6 must move radially inwardly. This is achieved and actuated through axially directed movements as will be explained in connection with the following figures.

Figure 2:
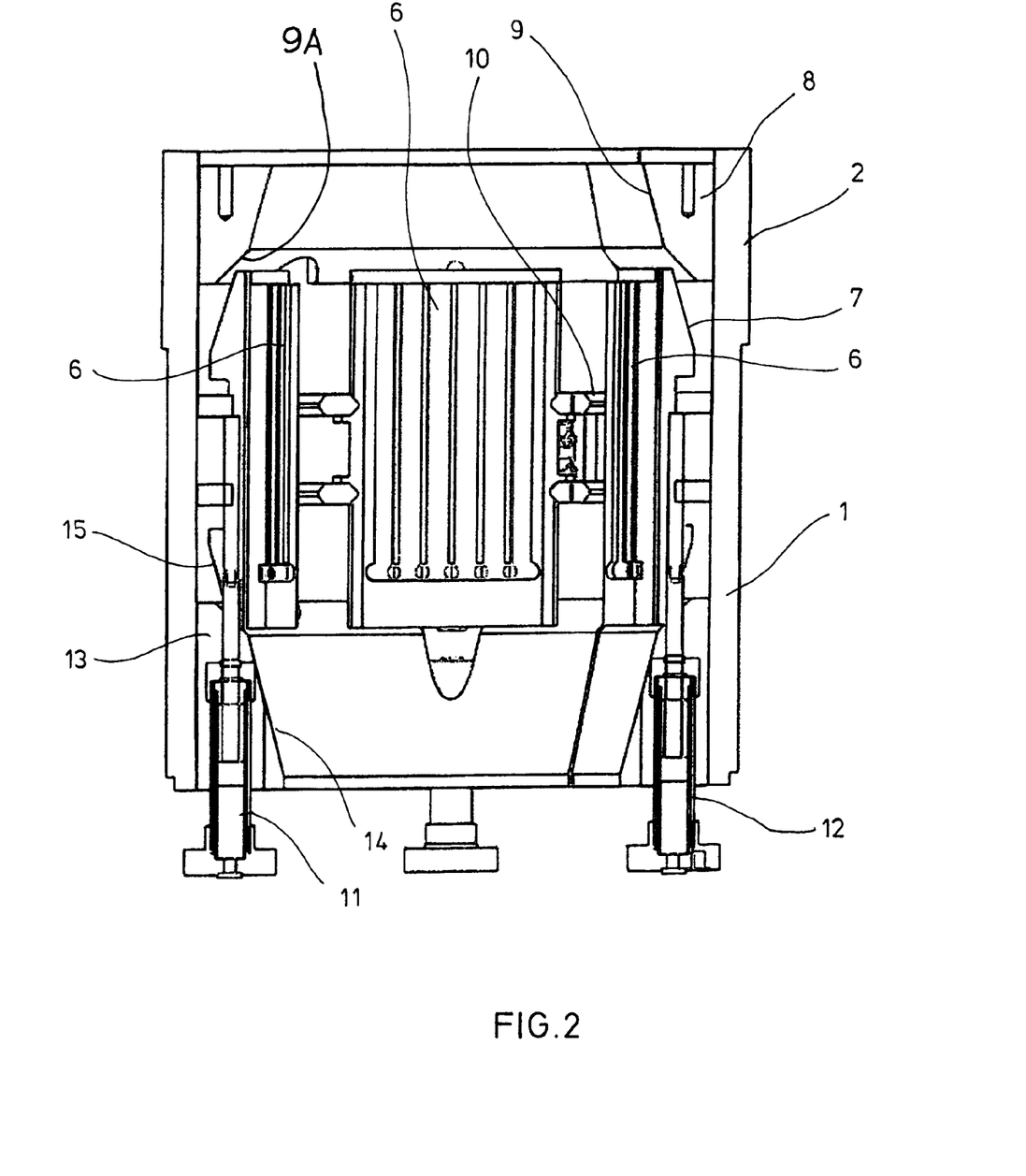
FIG. 2 is an axial sectional view through the apparatus in an operational ready condition with the clamping elements in a retracted position.
Figure 6:
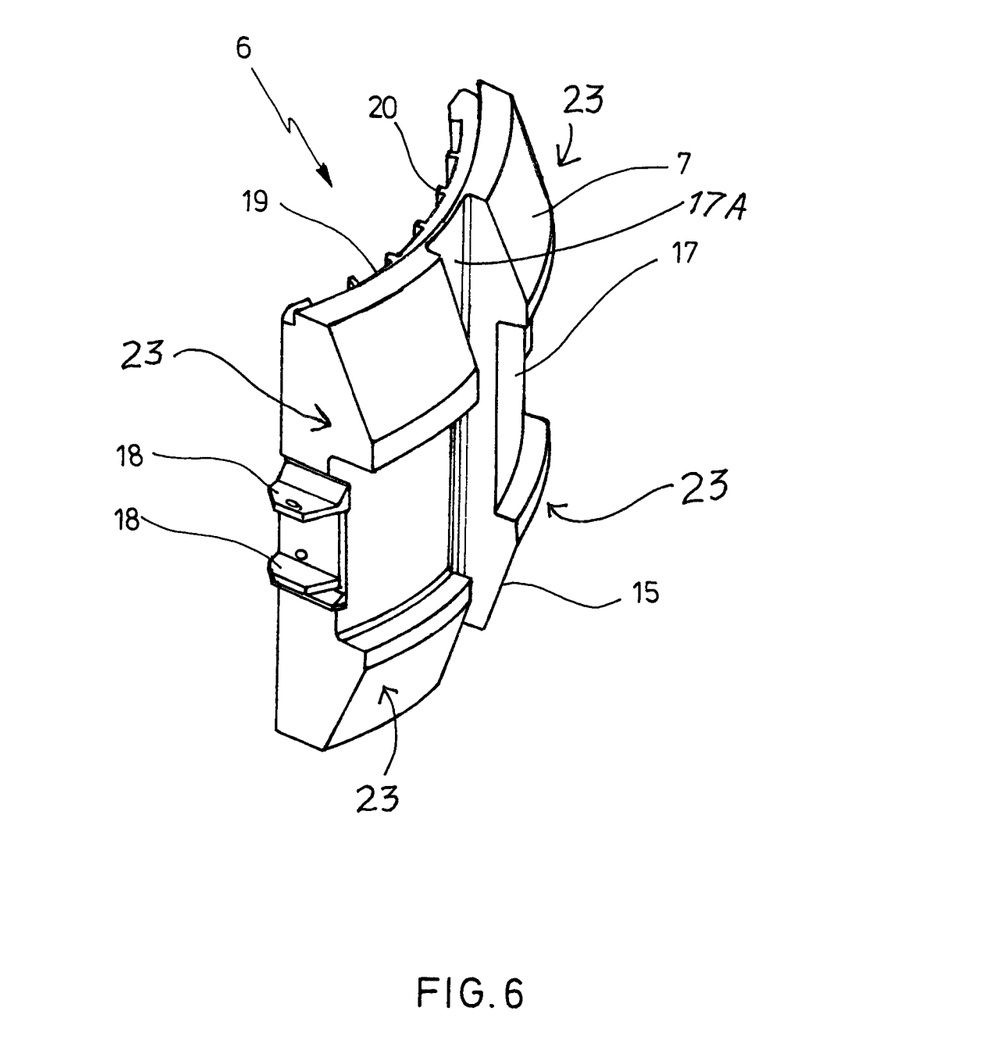
FIG. 6 is a perspective view of a single clamping element removed from the pipe clamping apparatus, as seen in a direction at an angle from the radial outer side onto the sliding surfaces of the clamping element.

FIG. 2 shows a vertical axial section through the device body 1. In the illustrated example embodiment, the apparatus includes four clamping elements 6, of which three of these clamping elements 6 can be seen in the sectional view of FIG. 2. Each clamping element 6 comprises at least one sliding surface 7 on a radially outwardly directed surface of the clamping element facing toward the device body 1 and thus facing away from the pipe that is to be held. The sliding surface 7 extends obliquely at a sloping angle relative to the vertical axial direction. A typical slope angle of the orientation of the sliding surface lies in the range from 10 to 20°, and the illustrated example embodiment has a slope angle of 15.5° relative to the vertical is or axial direction. Preferably the sliding surface 7 has a shape of a circular conical frustum or a segment thereof, with the stated slope angle at radial positions about the vertical axis. In other words, the sliding surface 7 is not a flat plane surface, as can be seen in FIG. 6 that will be discussed below.

Throughout this specification, the vertical direction refers to the axial direction or axis-parallel direction of the pipe and the apparatus, while the horizontal direction refers to the radial direction, in the illustrated example. The axial direction refers to the direction parallel to the axis of the pipe, i.e. the axis of the opening 22 of the apparatus, and the radial direction is the direction extending radially relative to that axis. Nonetheless, the apparatus is fully functional regardless of its horizontal or vertical orientation, in other words the apparatus is also functional when the axis thereof is oriented horizontally or at any angle between horizontal and vertical. In the example context of using the inventive apparatus to clampingly hold a drill pipe string on an oil drilling platform, however, the apparatus is oriented vertically axially as shown in the present drawings.

In the operating condition shown in FIG. 2, the positioning element 8 is arranged and positioned at least partially upwardly above the clamping elements 6. The positioning element 8 has a ring-shaped or annular configuration, which can be constructed as a single one-piece ring or preferably as a multi-piece ring assembled from plural ring segments similarly as the device body 1. This allows the positioning element to be assembled around or removed from a pipe that is already in place. The positioning element 8 comprises at least one actuating surface 9 that slopes obliquely relative to the vertical or axial direction. Preferably, the actuating surface 9 is configured as a circular conical frustum surface and has the same slope angle of its slope relative to the vertical direction as that of the sliding surface 7. Adjoining the bottom end or edge of the actuating surface 9 may be a less-steeply-sloped centering engagement surface 9A that ensures a cooperative capture and centering of the sliding surfaces 7 of the clamping elements 6 when the positioning element 8 moves axially downwardly as will be described next.

The positioning element 8 is arranged and guided so as to be vertically or axially movable within the device body 1. To actuate or drive the vertical axial motion of the positioning element relative to the device body 1, at least one actuator such as a pressure medium cylinder 16 (shown in FIG. 5) e.g. a hydraulic or pneumatic cylinder, is connected to the positioning element 8. As further visible in FIG. 2, the clamping elements 6 are held and guided by the mounting support or holder 10 so as to be movable both in a vertical or axial direction as well as a horizontal or radial direction relative to the device body 1. For example, the mounting support is axially movably guided relative to the device body, and the clamping elements are radially movably guided relative to the mounting support. This mounting support 10 preferably also has an annular ring-shaped configuration which is embodied as one-piece or as a multi-piece construction of several ring segments. In order to actuate or drive an axial positioning movement of the mounting support 10 and therewith of the clamping elements 6, actuators such as pressure medium cylinders 11 and 12, e.g. hydraulic cylinders or pneumatic cylinders, are connected to the mounting support 10. These cylinders are oriented vertically or axially parallel to the vertical axis of the apparatus.

A guide element 13 having at least one guide surface 14 for guiding the motion of the clamping elements 6 is arranged in the bottom or vertically lower region of the device body 1. The guide surface 14 slopes at an oblique angle relative to the vertical or axial direction, and preferably with the same slope angle as the actuating surface 9 of the positioning element 8. And just as discussed above regarding the sliding surface 7 and the actuating surface 9, while FIGS. 2 to 5 merely show the slope angle of the guide surface 14 in a two-dimensional view along the axial section, when considered in three dimensions the guide surface 14 preferably has a circular conical frustum shape. The guide surface 14 slopes radially inwardly downwardly, i.e. with a downward tapering diameter, while the actuating surface 9 of the positioning element 8 slopes radially inwardly in an upward direction, i.e. tapering upwardly or having an expanding diameter in a downward direction.

The clamping elements 6 each respectively have a lower sliding surface 15 on the bottom or lower portion of the radially outer surface thereof facing toward the device body 1. Particularly, the lower sliding surfaces 15 are positioned, angled and dimensioned for cooperation and contact with the guide surface 14. Preferably, the lower sliding surfaces 15 slope obliquely downwardly relative to the vertical axial direction at the same slope angle as the guide surfaces 14 of the guide element 13. The guide element 13 is preferably immovably fixed or secured to the device body 1. The guide element 13 may be a separate component that is fixedly secured to the device body, or may be an integral one-piece portion of the device body 1 provided with the sloping guide surface 14. To allow the guide element 13 with its guide surface 14 to be exchanged and replaced, it is preferred that the guide element is a separate removable component relative to the device body.

Figure 3:
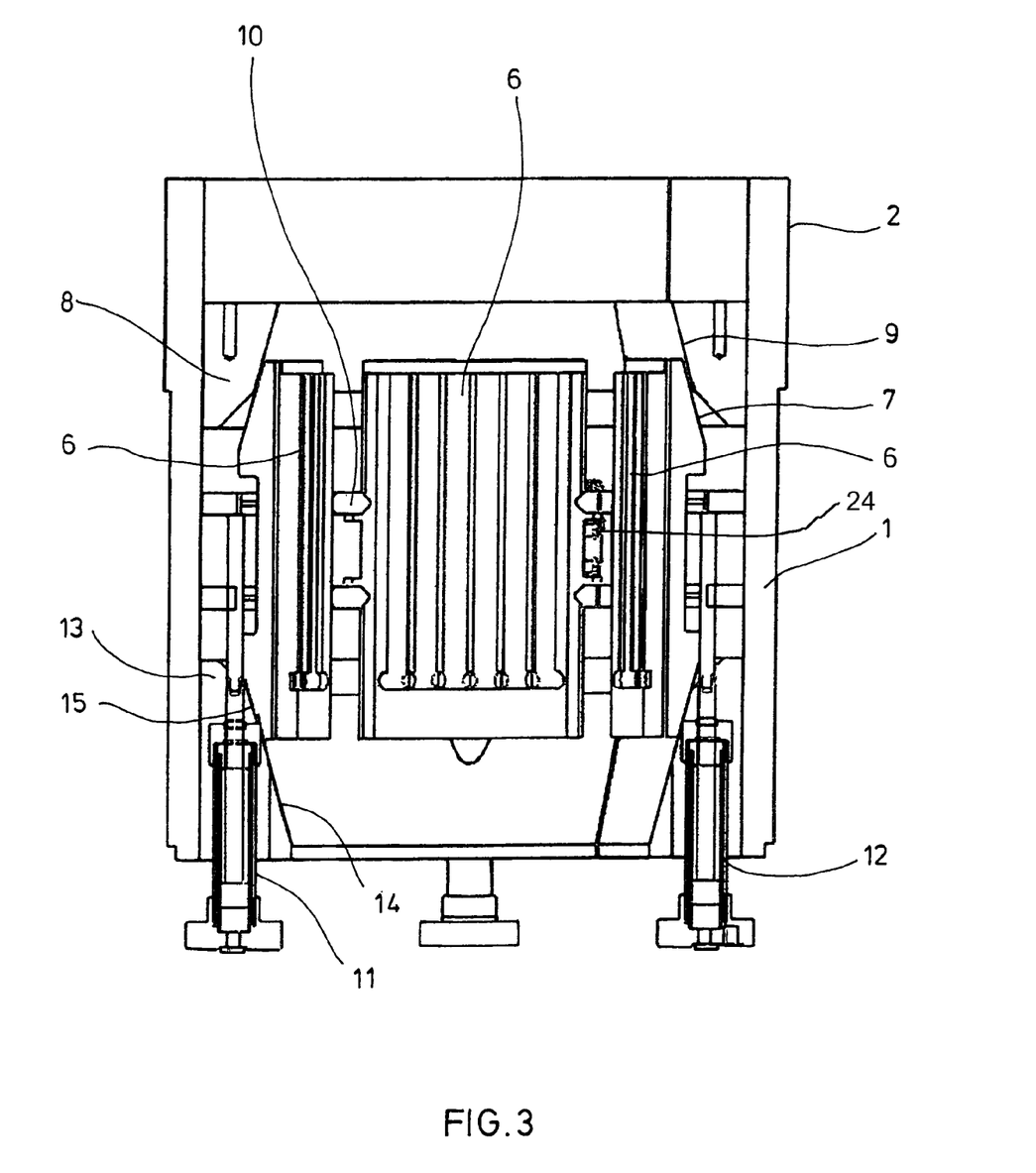
FIG. 3 is an axial sectional view of the apparatus according to FIG. 2, but after a partial axial lowering of the positioning element and the mounting support, whereby the clamping elements have been moved partially radially inwardly toward a clamping or holding position.

FIG. 3 is a view similar to that of FIG. 2, and shows the same arrangement, but after a partial lowering of the positioning element 8 by actuation of the cylinder(s) 16. In this position shown in FIG. 3, it can be seen that the actuating surface 9 of the positioning element 8 hereby is in contact with the upper sliding surfaces 7 of the clamping elements 6. Furthermore, there is also already contact between the lower sliding surfaces 15 of the clamping elements 6 and the guide surface 14 of the guide element 13. Due to this mutual sliding contact of the upper sliding surfaces 7 with the actuating surface 9, as well as the lower sliding surfaces 15 with the guide surface 14, thereby the relative vertical or axial motion of the parts brings about a radially inwardly directed motion of the clamping elements 6 toward one another, i.e. toward the central axis of the device and thus toward the pipe (not shown) that is to be clampingly held. Namely, the actuated downward movement of the positioning element 8 causes the actuating surface 9 to push downwardly on the upper sliding surfaces 7 of the clamping elements 6, whereby the sloping configuration of the actuating surface 9 causes a radially inward wedging action that urges or pushes the upper ends of the clamping elements 6 radially inwardly. Simultaneously, the downward pushing of the actuating surface 9 also pushes the clamping elements 6 downwardly, which causes the lower sliding surfaces 15 of the clamping elements 6 to slide downwardly along the fixed guide surface 14. This axially motion of the clamping elements 6 is also driven by actuation of the cylinders 11 and 12 connected to the mounting support 10. During the downward motion of the clamping elements 6, the inward sloping orientation of the guide surface 14 causes a radially inward deflection of the lower ends of the clamping elements 6.

To ensure that the upper ends of the clamping elements 6 are pushed radially inwardly by the actuating surface 9 to the same amount or extent as the lower ends of the clamping elements are pushed radially inwardly by the guide surface 14, for this purpose preferably the vertical motion of the positioning element and the vertical motion of the mounting support 10 are coordinated with one another. Particularly, if the oblique slope of the actuating surface 9 and upper sliding surfaces 7 matches the oblique slope of the guide surface 14 and the lower sliding surfaces 15, then the vertical motion of the positioning element 8 is coordinated with that of the mounting support 10 such that the positioning element 8 traverses a vertical distance twice the vertical distance traversed by the mounting support 10. Thereby, the clamping elements 6 will move in the vertical direction one-half as far as the vertical motion of the positioning element 8. In effect, of the total vertical motion of the positioning element 8 relative to the device body 1, one half of that motion will occur relative to the clamping elements 6, and the other half of that motion will be exhibited as vertical motion between the clamping elements 6 and the guide element 13 which is fixed to the device body 1. Thus, the vertical motion of the actuating surface 9 relative to the upper sliding surfaces 7 is equal to the vertical motion of the lower sliding surfaces 15 relative to the guide surface 14. Due to the equal slope angles, the upper ends of the clamping elements 6 will be driven radially inwardly by the cooperation of the actuation surface 9 with the upper sliding surfaces 7, by the same radial distance as the lower ends of the clamping elements 6 are driven radially inwardly by the lower sliding surfaces 15 sliding along the guide surface 14. This coordination of the motion ensures that the clamping surfaces 6A of the clamping elements 6 remain axis-parallel and thus also parallel to the surface of the pipe that is to be clampingly held. This coordination of the motion is achieved by suitably coupling the actuation of the positioning element 8 and the actuation of the mounting support 10. For example, this is preferably achieved by appropriate hydraulic control and actuation of the respective hydraulic cylinders 11 and 12 as well as 16 through a suitable hydraulic control unit.

Figure 4:
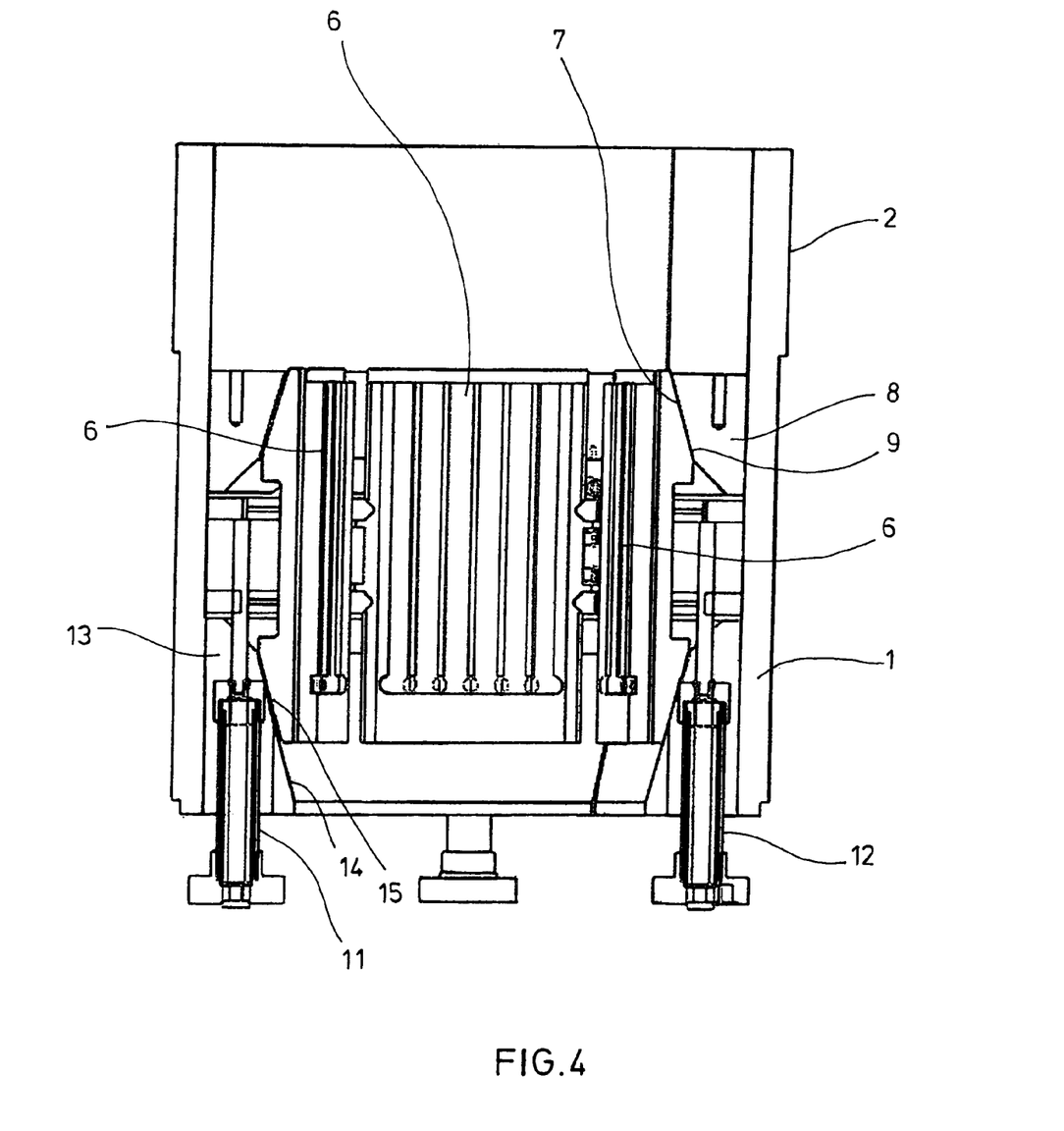
FIG. 4 is a further axial sectional view of the apparatus according to FIGS. 2 and 3, but showing the maximally lowered position of the positioning element and the mounting support, and correspondingly the maximally radially inwardly moved position of the clamping elements.

FIG. 4 shows the arrangement according to FIGS. 2 and 3, but in a maximally lowered position of the positioning element 8 and of the mounting support 10, respectively. Thus, the clamping elements 6 are hereby maximally moved radially inwardly toward one another, within the range allowed by the particular exemplary construction. Namely, this would be the clamping position for the smallest diameter pipe that can be clampingly held using the particular illustrated apparatus fitted with the particular illustrated clamping elements and the like. In this regard, the clamping elements and/or the positioning element and/or the guide element can be exchanged in the device body, in order to adapt the apparatus to different diameter ranges of pipes that are to be handled.

Figure 5:
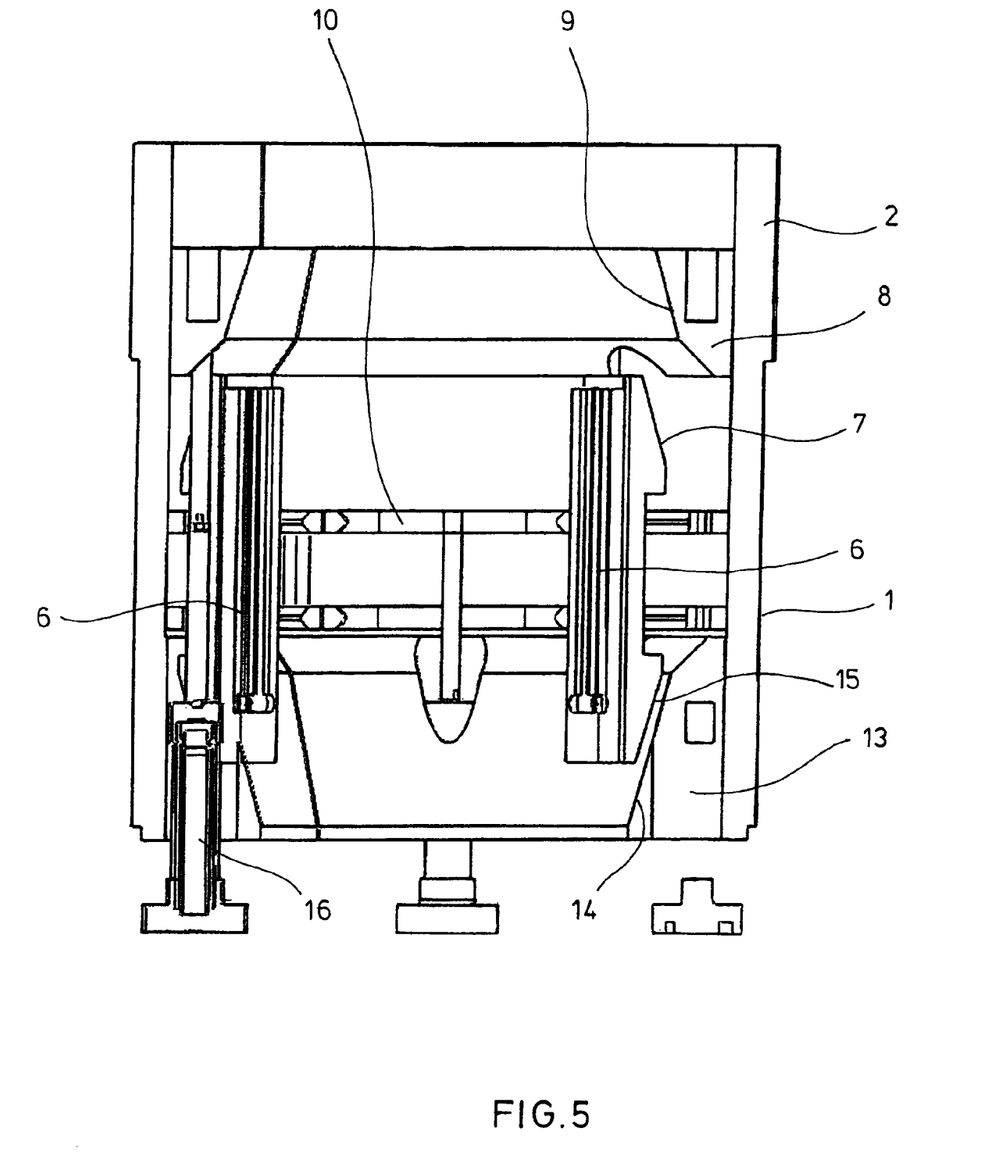
FIG. 5 is another axial sectional view of the apparatus, but along a section plane that has been turned by 90° about the axis relative to FIGS. 2 to 4.

FIG. 5 shows an axial sectional view of the same example embodiment of the inventive apparatus, but along a vertical axial section plane that has been rotated by 90° relative to the views of FIGS. 2 to 4. In this sectional view, one pressure medium cylinder 16, such as a hydraulic cylinder, for vertically or axially driving the positioning element 8 can be seen. Preferably two of such cylinders 16 are provided for axially driving the positioning element 8. In this regard, for example, the cylinder of the piston device is fixedly mounted relative to the device body 1, while the piston rod end of the piston of the piston device is connected to the positioning element.

FIG. 6 shows a perspective back side (or radially outer side) view of a clamping element 6. It can be seen that each clamping element 6 generally has the shape of an annular segment of an annular cylindrical shell with particular surface configurations. Namely, the upper sliding surfaces 7 and the lower sliding surfaces 15 are respectively provided on radially outward protrusions 23 of the clamping element 6. A horizontally extending structural space or gap 17 and a vertically extending structural space or gap 17A divide the protrusions 23 from one another in the vertical axial direction and in the horizontal circumferential direction, respectively. The pressure medium cylinder 16 for axially driving the positioning element 8 extends vertically through the vertically extending space 17A. The horizontally circumferentially extending space 17 allows the several clamping elements 6 to be held radially inwardly and circumferentially to one another. Furthermore, along each vertically extending lateral side edge, each clamping element 6 has lateral mounting protrusions 18, which are engaged by the mounting support 10 in order to guide and move the clamping elements 6 in the apparatus. The radially inward facing clamping surface 6A of the clamping elements 6 has a profiled surface contour formed with recessed grooves 19 and/or radially protruding ribs 20 as discussed above. Thereby, high local pressing forces can be applied onto the pipe that is to be clampingly held.

The pressure medium cylinders 11, 12 and 16, e.g. hydraulic cylinders or pneumatic cylinders, are preferably embodied as double-acting cylinders. Thereby, both a forward advancing thrust motion as well as a retracting return stroke of the respective cylinder can be hydraulically (or pneumatically) actuated and controlled, and the respective pressure medium connections can be arranged exclusively at one end of the cylinder.

The selected oblique slope angle of the sliding surfaces 7 and 15 supports or establishes a self-locking behavior of the apparatus, i.e. of the clamping elements 6 against the pipe. Namely, once the clamping elements 6 are clampingly engaged against the surface of the pipe, if the (downward or upward) tension force on the clamped pipe increases, then the clamp holding force will also automatically be increased due to the respective obliquely sloping wedge surfaces acting inwardly on one another. Thus, once a pipe string is clampingly held in the apparatus, the pipe string cannot fall downwardly or slide upwardly through the apparatus.

Due to the segmented construction of the annular components of the illustrated example embodiment of the apparatus, i.e. the device body 1, the positioning element 8, the mounting support 10 and the guide element 13, it is possible to separate the individual segments of each one of these components and laterally remove and/or assemble these segments around a pipe string that is already in place.

The clamping elements 6 can be held under tension relative to the mounting support 10 by springs 24 such as compression springs or tension springs. These springs act as return springs that support a retraction of the clamping elements 6 into the initial position illustrated in FIG. 2, when the pressure medium cylinders are retracted from the position of FIG. 4 to the position of FIG. 2.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims. The abstract of the disclosure does not define or limit the claimed invention, but rather merely abstracts certain features disclosed in the application.

What is claimed is:

1. An apparatus for holding a pipe, comprising:
   a device body extending axially along an axis;
   plural clamping elements that are arranged movably in said device body, and that each respectively have a first sliding surface on a radially outer side thereof, and that each respectively further have a second sliding surface provided thereon;
   a positioning element that is arranged axially movably in said device body, and that has an actuating surface arranged adjacent to and cooperating with said first sliding surface of each one of said clamping elements so that an axial motion of said positioning element exerts a radial motion component on said clamping elements through said actuating surface cooperating with said first sliding surface of each one of said clamping elements; and
   a guide element with a guide surface positioned and arranged adjacent to and cooperating with said second sliding surface of each one of said clamping elements.

2. The apparatus according to claim 1, wherein said positioning element has an annular ring shape.

3. The apparatus according to claim 2, wherein said positioning element comprises two ring segments that are releasably connected together.

4. The apparatus according to claim 1, wherein said actuating surface of said positioning element slopes obliquely relative to said axis.

5. The apparatus according to claim 1, further comprising a first actuator that is connected to said positioning element and that is adapted to drive said positioning element to move axially relative to said device body.

6. The apparatus according to claim 5, wherein said first actuator comprises a double-acting hydraulic cylinder.

7. The apparatus according to claim 1, further comprising a mounting support that movably supports said clamping elements in said device body, and a second actuator that is connected to said mounting support and that is adapted to drive said mounting support and therewith said clamping elements to move axially relative to said device body.

8. The apparatus according to claim 7, wherein said second actuator comprises a double-acting hydraulic cylinder.

9. The apparatus according to claim 1, further comprising a mounting support that movably supports said clamping elements in said device body, and at least one spring that holds and biases said clamping elements relative to said mounting support.

10. The apparatus according to claim 1, wherein each one of said clamping elements has axially opposite first and second end portions, said first sliding surface is respectively provided on said first end portion of each one of said clamping elements, and said second sliding surface is respectively provided on said second end portion of each one of said clamping elements.

11. The apparatus according to claim 1, wherein said guide element is connected immovably with said device body.

12. The apparatus according to claim 1, wherein said device body includes an element to secure said device body against turning about said axis.

13. The apparatus according to claim 1, wherein each one of said clamping elements respectively has a clamping surface on a radially inner side thereof, and said clamping surface is configured and adapted to be driven into contact with and to hold the pipe when the radial motion component is exerted on said clamping elements.

14. An apparatus for holding a pipe, comprising:
   a device body with an opening passing axially therethrough along an axis, wherein said opening is adapted to receive the pipe extending axially through said opening;
   plural clamping elements arranged axially and radially movably in said device body, wherein each respective one of said clamping elements has a radially inwardly directed clamping surface adapted to contact an outer surface of the pipe, as well as a first sliding surface and a second sliding surface on a radially outer side of said respective clamping element;
   a positioning element arranged axially movably in said device body, wherein said positioning element has an actuating surface arranged to slidingly contact and cooperate with said first sliding surface so that an axial motion of said positioning element exerts a radial motion component on said clamping elements; and
   a guide element arranged in said device body, wherein said guide element has a guide surface arranged to slidingly contact and cooperate with said second sliding surface so as to deflect an axial motion of said clamping elements partially into a radial motion of said clamping elements.

15. The apparatus according to claim 14, wherein said first sliding surface, said second sliding surface, said actuating surface and said guide surface each respectively have a conical frustum shaped surface configuration respectively tapering to a narrower radius about said axis progressing respectively axially outwardly away from an axial center of said apparatus.

16. The apparatus according to claim 14, further comprising a mounting support that is arranged axially movably in said device body and that is connected to said clamping elements so as to mount said clamping elements axially and radially movably in said device body.

17. The apparatus according to claim 16, further comprising a first actuator connected to said positioning element and adapted to drive said positioning element axially relative to said device body, and a second actuator connected to said mounting support and adapted to drive said mounting support and therewith said clamping elements axially relative to said device body.

18. The apparatus according to claim 17, wherein said first and second actuators are coupled to one another such that said second actuator, said mounting support and said clamping elements traverse an axial distance equal to one-half of an axial distance traversed by said first actuator and said positioning element in said axial motion thereof, and wherein said first sliding surface, said second sliding surface, said actuating surface and said guide surface each slope at the same oblique slope angle magnitude relative to said axis.

19. The apparatus according to claim 14, wherein said guide element is fixed to said device body.

20. An apparatus for holding a pipe, comprising:

a device body extending axially along an axis;

plural clamping elements that are arranged movably in said device body, and that each respectively have a first sliding surface on a radially outer side thereof;

a positioning element that is arranged axially movably in said device body, and that has an actuating surface arranged adjacent to and cooperating with said first sliding surface of each one of said clamping elements so that an axial motion of said positioning element exerts a radial motion component on said clamping elements through said actuating surface cooperating with said first sliding surface of each one of said clamping elements;

a mounting support that movably supports said clamping elements in said device body; and an actuator that is connected to said mounting support and that is adapted to drive said mounting support and therewith said clamping elements to move axially relative to said device body.

* * * * *